(12) United States Patent
Parks et al.

(10) Patent No.: US 9,010,802 B2
(45) Date of Patent: Apr. 21, 2015

(54) INFLATOR HAVING A MECHANICALLY COUPLED TWO-PIECE HOUSING

(71) Applicants: Brent Parks, Englewood, CO (US); Matthew A. Cox, Centerville, UT (US); Bradley W. Smith, Plain City, UT (US)

(72) Inventors: Brent Parks, Englewood, CO (US); Matthew A. Cox, Centerville, UT (US); Bradley W. Smith, Plain City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 14/064,983

(22) Filed: Oct. 28, 2013

(65) Prior Publication Data

US 2014/0049025 A1 Feb. 20, 2014

Related U.S. Application Data

(63) Continuation of application No. 12/943,203, filed on Nov. 10, 2010, now Pat. No. 8,662,532.

(51) Int. Cl.
  *B60R 21/26* (2011.01)
  *B60R 21/20* (2011.01)
  *B60R 21/268* (2011.01)
  *B60R 21/264* (2006.01)

(52) U.S. Cl.
  CPC ............... *B60R 21/20* (2013.01); *B60R 21/26* (2013.01); *B60R 21/268* (2013.01); *B60R 2021/26058* (2013.01); *B60R 2021/26076* (2013.01); *B60R 2021/2642* (2013.01)

(58) Field of Classification Search
  CPC .................... B60R 2021/26076; B60R 21/26; B60R 21/262; F42B 3/04
  USPC ................. 280/736, 741; 102/530–531
  See application file for complete search history.

(56) References Cited

U.S. PATENT DOCUMENTS

| | | | |
|---|---|---|---|
| 4,561,675 A | 12/1985 | Adams et al. | |
| 4,796,912 A | 1/1989 | Lauritzen et al. | |
| 5,000,479 A | 3/1991 | Werner et al. | |
| 5,236,675 A | 8/1993 | Swain et al. | |
| 5,753,852 A | 5/1998 | Bernau et al. | |
| 6,019,389 A | 2/2000 | Burgi et al. | |
| 6,044,557 A | 4/2000 | Smith et al. | |
| 6,217,065 B1 * | 4/2001 | Al-Amin et al. | 280/737 |
| 6,464,254 B2 | 10/2002 | Chikaraishi et al. | |
| 6,746,046 B2 | 6/2004 | Rink et al. | |
| 6,851,705 B2 | 2/2005 | Young et al. | |
| 6,962,365 B2 | 11/2005 | Rink et al. | |
| 6,964,430 B2 | 11/2005 | Blackburn et al. | |
| 7,004,778 B2 | 2/2006 | Barker et al. | |
| 7,367,584 B2 | 5/2008 | Blackburn | |
| 7,413,216 B2 | 8/2008 | Numoto et al. | |
| 7,481,453 B2 | 1/2009 | Breed | |
| 7,641,230 B2 | 1/2010 | Schramm et al. | |
| 7,891,703 B2 | 2/2011 | Chen et al. | |
| 8,047,569 B2 | 11/2011 | Cox et al. | |

(Continued)

FOREIGN PATENT DOCUMENTS

| | | |
|---|---|---|
| JP | 2007-197006 | 8/2007 |
| JP | 2007-296891 | 11/2007 |
| JP | 2008-105618 | 5/2008 |

*Primary Examiner* — James English
(74) *Attorney, Agent, or Firm* — Pauley Petersen & Erickson

(57) ABSTRACT

An inflator including an initiator and a bulkhead molded around the initiator. The inflator includes a housing formed of two overlapping housing portions mechanically coupled together around a portion of the bulkhead. One of the housing portions includes cut tabs that are crimped into cut receivers of the other housing portion.

20 Claims, 2 Drawing Sheets

(56) References Cited

U.S. PATENT DOCUMENTS

| | | |
|---|---|---|
| 8,074,571 B2 | 12/2011 | Hirooka et al. |
| 8,215,670 B2 | 7/2012 | Chen et al. |
| 2002/0185849 A1 | 12/2002 | Sawa et al. |
| 2005/0062273 A1 | 3/2005 | Matsuda et al. |
| 2007/0013178 A1 | 1/2007 | Aird |
| 2008/0217895 A1 | 9/2008 | Hayakawa et al. |
| 2009/0167006 A1 | 7/2009 | Schönhuber et al. |
| 2009/0230664 A1 | 9/2009 | Hayakawa et al. |
| 2010/0007123 A1 | 1/2010 | Cord et al. |
| 2012/0112442 A1 | 5/2012 | Parks et al. |
| 2012/0247361 A1* | 10/2012 | Kobayashi et al. ........... 102/530 |

* cited by examiner

INFLATOR HAVING A MECHANICALLY COUPLED TWO-PIECE HOUSING

CROSS-REFERENCE TO RELATED APPLICATION

This application is a continuation of U.S. patent application Ser. No. 12/943,203, filed 10 Nov. 2010, which is the co-pending parent application and which is incorporated by reference herein and is made a part hereof, including but not limited to those portions which specifically appear hereinafter.

BACKGROUND OF THE INVENTION

This invention relates generally to inflators for use in inflating inflatable restraint airbag cushions, such as used to provide impact protection to occupants of motor vehicles. More particularly, the invention relates to two-piece gas generator housings that do not require welding for being joined together.

It is well known to protect a vehicle occupant by means of safety restraint systems which self-actuate from an undeployed to a deployed state without the need for intervention by the operator, i.e., "passive restraint systems." Such systems commonly contain or include an inflatable vehicle occupant restraint or element, such as in the form of a cushion or bag, commonly referred to as an "airbag cushion." In practice, such airbag cushions are typically designed to inflate expand with gas when the vehicle encounters a sudden deceleration, such as in the event of a collision. Such airbag cushions may desirably deploy into one or more locations within the vehicle between the occupant and certain parts of the vehicle interior, such as the doors, steering wheel, instrument panel or the like, to prevent or avoid the occupant from forcibly striking such parts of the vehicle interior. For example, typical or customary vehicular airbag cushion installation locations have included in the steering wheel, in the dashboard on the passenger side of a car, along the roof line of a vehicle such as above a vehicle door, and in the vehicle seat such as in the case of a seat-mounted airbag cushion. Other airbag cushions such as in the form of knee bolsters and overhead airbags also operate to protect other or particular various parts of the body from collision.

In addition to one or more airbag cushions, inflatable passive restraint system installations also typically include a gas generator, also commonly referred to as an "inflator." Upon actuation, such an inflator device desirably serves to provide an inflation fluid, typically in the form of a gas, used to inflate an associated airbag cushion. Various types or forms of inflator devices have been disclosed in the art for use in inflating an inflatable restraint system airbag cushion.

One particularly common type or form of inflator device used in inflatable passive restraint systems is commonly referred to as a pyrotechnic inflator. In such inflator devices, gas used in the inflation of an associated inflatable element is derived from the combustion of a pyrotechnic gas generating material.

An airbag inflator often includes a two-piece pressure vessel. The pressure vessel halves must be joined after the internal components and, for example, gas generant have been loaded. The two pieces are typically welded together, such as using laser welding, inertia welding, or MIG welding, or crimped together, such as using orbital or segmented crimps.

The automotive industry continues to demand inflatable restraint systems that are smaller, lighter, and less expensive to manufacture. As vehicles become smaller and more compact, corresponding changes to associated inflatable restraint systems are desired and required in order to meet the constraints of these smaller vehicles.

SUMMARY OF THE INVENTION

The present invention provides an improved inflator device and associated or corresponding methods of operation.

As described in greater detail below, there is provided an inflator that includes a two-piece housing mechanically coupled together.

The invention provides an inflator including a housing with two halves connected without welding. The housing connection according to one embodiment of the invention incorporates a metal forming process, such as including a new crimp structure and method, that eliminates the need for welding and welding's inherent metal joining quality issues.

Embodiments of the invention further provide a desirable position of initiator connector pins on the inflator. Current OEM airbag envelope specifications are requiring greater use of tubular inflators, such as for passenger inflators, to fit into the limited space available in the vehicle. Typical commercial tubular inflators have initiators disposed on an end of the inflator. Such end-disposed initiators can be difficult to access during assembly to attach the electrical connector. In accordance with one aspect of this invention, a centrally positioned bulkhead element of this invention locates the initiators at or near the middle of the inflator, thereby providing easier access for attaching the electrical connector to the initiator pins.

The general object of the invention can be attained, at least in part, through an inflator including a housing at least in part defining a chamber. The housing includes a first housing portion connected to a second housing portion by a protrusion of the first housing portion latched to receiver of the second housing portion. The inflator further includes an initiator operatively associated with the chamber.

The invention further comprehends an inflator including an initiator and a bulkhead including the initiator. The inflator can include a single initiator in a single stage inflator, or multiple initiators in a dual stage inflator. The bulkhead includes a first connection end, and a second connection end that is opposite the first connection end. The inflator further includes a first housing portion and a second housing portion. The first housing portion has a first open end extending over the first connection end, and the second housing portion has a second open end extending over the second connection end. A portion of the second housing portion at the second open end is disposed between a portion of the first housing portion and the bulkhead and mechanically coupled to the first housing portion.

The invention still further comprehends an inflator and a bulkhead including the initiator. The bulkhead includes a first connection end, and a second connection end that is opposite side from the first connection end. The inflator includes a first housing portion with a first open end disposed over the first connection end. The first housing portion includes a first attachment portion adjacent the first open end and disposed around the first connection end. The inflator includes a second housing portion with a second open end disposed over the second connection end. The second housing portion includes a second attachment portion that is adjacent the second open end and disposed around the second connection end. One of the first attachment portion or the second attachment portion includes a plurality of tabs, and an other of the first attachment portion and the second attachment portion including a plurality of tab receivers. The second attachment portion is disposed between the first attachment portion and the bulkhead, and each of the plurality of tabs is disposed within one of the plurality of tab receivers to connect the housing portions around the bulkhead.

The invention also comprehends a method of forming the inflator. The method includes forming the protrusion and receivers on the respective housing portions, assembling the housing portions with a length of one housing portion over a length of a second housing portion, and latching the protrusion to the receiver. When the protrusions are formed as tabs, the method can include cutting or forming the tabs from the housing wall, sliding the housing portion with tabs over the housing portion including cut tab receivers, and bending or otherwise crimping each of the tabs into a corresponding tab receiver to latch the two housing portions together. The method can further include a step of securing the bulkhead to the housing portions to retain the bulkhead in position during inflator deployment. The housing portions can be formed to extend around the portion of the bulkhead including the initiator, thereby supporting the initiator and the bulkhead during deployment.

Other objects and advantages will be apparent to those skilled in the art from the following detailed description taken in conjunction with the appended claims and drawings.

DETAILED DESCRIPTION OF THE INVENTION

Figure 1:
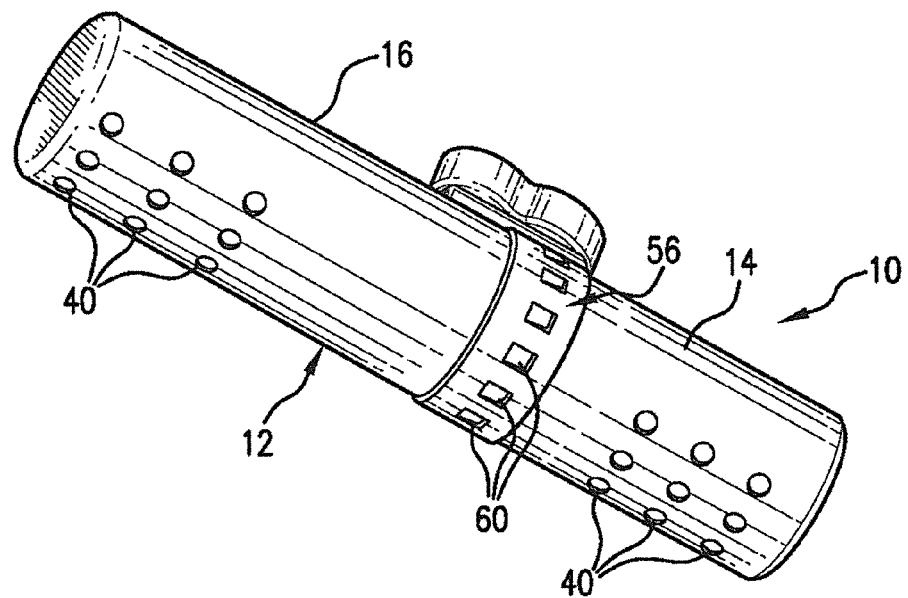
FIG. 1 is a perspective view of an inflator in accordance with one aspect of the invention.

FIGS. 1-4 illustrate an inflator, generally designated with the reference numeral 10, and in accordance with a one embodiment of the invention. While the invention will be described hereinafter with particular reference to a dual stage passenger side airbag inflatable restraint system installation, it will be understood that the invention has general applicability to other types or kinds of airbag assemblies including, for example, single stage passenger, single or dual stage driver side or side airbag assemblies such as for automotive vehicles including vans, pick-up trucks, and particularly automobiles.

Figure 3:
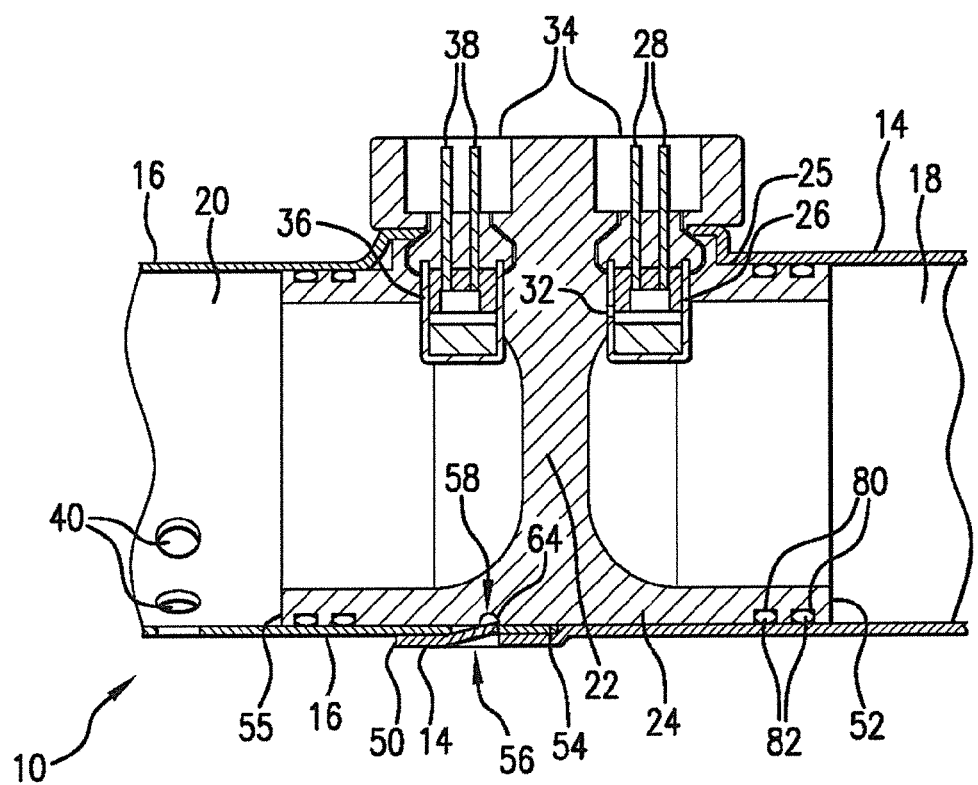
FIG. 3 is a sectional view of the inflator shown in FIG. 1.

The inflator 10 has a generally cylindrical external outline and includes a generally cylindrical housing 12, such as having a tubular elongated form. The housing 12 may desirably be formed or made of metal or steel or other materials as may be desired for particular applications. The housing 10 includes a multi-piece construction, being formed of a first housing portion 14 mechanically coupled to a second housing portion 16. The housing 12 at least in part defines both a first or primary chamber 18 and a second or secondary chamber 20, as shown in FIG. 3. The first chamber portion 18 contains a quantity of a first gas generant for forming a first inflation gas. The second chamber portion 20 contains a quantity of a second gas generant reactable for forming a second inflation gas. The gas generant can be, without limitation, a pressurized gas and/or a reactable solid material, such as in a tablet or wafer form. Aspects of this invention have particular applicability to single or dual stage inflators using reactable solid gas generant materials, such as currently commercially available In the illustrated embodiments, the first and second chamber portions, 18 and 20, are separated by a center wall 22 of a bulkhead element 24. As will be appreciated, the broader practice of the invention is not necessarily limited to constructions utilizing such a bulkhead element for the separation of such first and second chambers portions. Those skilled in the art and guided by the teachings herein provided will appreciate that desired separation of first and second combustion chambers can be affected by other suitable means or techniques such as may be employed in the practice of the invention.

The inflator 10 also includes a first initiator 26 operatively associated with the first chamber portion 18 in reaction initiating communication with the chamber contents, such as at least a portion of a quantity of a first gas generant. To that end, the first initiator 26 extends through an opening 32 in the bulkhead 24 and to the first combustion chamber 18. The first initiator 26, upon actuation, can serve or act to heat or ignite the gas generant to form an inflation gas. In one preferred embodiment of this invention, the bulkhead 24 is formed by a plastic material, such as can be molded around the initiator(s).

The inflator 10 also includes a second initiator 36 operatively associated with the second combustion chamber 20 in reaction initiating communication with the chamber contents, such as at least a portion of a quantity of a second gas generant. The second initiator 36, upon actuation, can serve or act to heat or ignite the second gas generant to form a second inflation gas.

In accordance with one preferred embodiment, the first initiator 26 and the second initiator 36 are both radially connected to a side wall 25 of the bulkhead 24. Each of the initiators, 26 and 36, include one or more connector pins 28 or 38, respectively, through which an electric activation signal is received. The bulkhead includes a radially extending connector socket 34 formed around the connector pins, 28 and 38, of each of the initiators, 26 and 36. The size, shape, number, placement, and configuration of the initiators, pins, and connector sockets can vary depending on need.

Referring to FIG. 1, the housing 12 includes gas flow openings 40 such that gas may flow out of inflator 10 so that it may be channeled into an associated airbag (not shown). The gas flow openings 40 may or may not be sealed by one or more burst disks, foil elements, or the like prior to deployment. As will be appreciated by those skilled in the art following the teachings herein provided, various components and configurations are available for use within the first and second chamber portions 18 and 20, depending on need. Examples of such components include, without limitation, sub-chambers, elongated baffles, filters, diffuser chambers, and/or other gas treatment components, When actuated, the first initiator 26 produces ignition products such as including hot gas that communicates with the gas generant within the first chamber portion 18. When the pressure within the first chamber portion 18 is sufficiently elevated, the burst foil normally closing the exit openings 40 ruptures and allows the gas to exit the chamber 18 therethrough. The gas flows out of the inflator 10 via the gas flow openings 40 in the housing 12 such that gas may be appropriately channeled into an associated airbag (not shown) to deploy the airbag. Those skilled in the art and guided by the teachings herein provided will appreciate that initiators and gas generants are known in the art and that a variety of different features may be used for these components.

When properly actuated, the second initiator 36 produces ignition products such as including hot gas that communicates with the gas generant within the second chamber portion 20. When the pressure from within the second chamber portion 20 becomes sufficiently large, a burst disk ruptures or otherwise allows the gas to exit the second chamber portion 20 through the gas flow openings 40 of the second housing portion. It will be appreciated that an inflator assembly in accordance with the invention can provide operation performance in accordance with selected operating conditions as may be required or desired for particular inflatable restraint system installations and applications. More specifically, an inflator assembly of the invention can be actuated in a manner such that either or both the quantity or rate of inflation gas production can be appropriately varied, such as at the time of a vehicle crash or collision incident, to take into account one or more conditions of occupant presence, as described above. Such inflator performance adaptability results from the subject inflator having two discrete and ballistically isolated chambers of gas generant materials.

Various sizes, shapes, and configurations are available for the first and second housing portions, initiator, and bulkheads, depending on need. For example, the bulkhead center wall 22 can include one or more openings sealed with a burst disk. As another example, the size and shape of the housing and/or gas flow openings can vary depending on need.

The two housing portions 14 and 16 forming the housing 12 of this invention are desirably mechanically coupled together, instead of using known welding techniques. In one embodiment of this invention, the first housing portion is connected to a second housing portion by a protrusion of the first housing portion latched to a receiver of the second housing portion. In particular embodiments of this invention, such as shown in FIGS. 1-4, the protrusion and/or the receiver are formed from or in the metal housing wall.

The mechanical coupling provided by the protrusion and receiver of this invention can eliminate the need for welding the housing. Weld joints, especially a critical and structural weld, has a wide variety of parameters that need to be controlled to provide a reproducible and reliable metal joint. By using the relatively simple metal forming process of the invention, the joint produced is conceivably more robust, less susceptible to quality issues and less expensive. In one embodiment of this invention, the forming process of this invention includes forming and inserting structural crimp tabs on one inflator housing half into matching openings on the second inflator housing half as shown in FIGS. 1-4. The mechanically coupling of the inflator halves according to this invention provides a simple, verifiable method.

Figure 4:
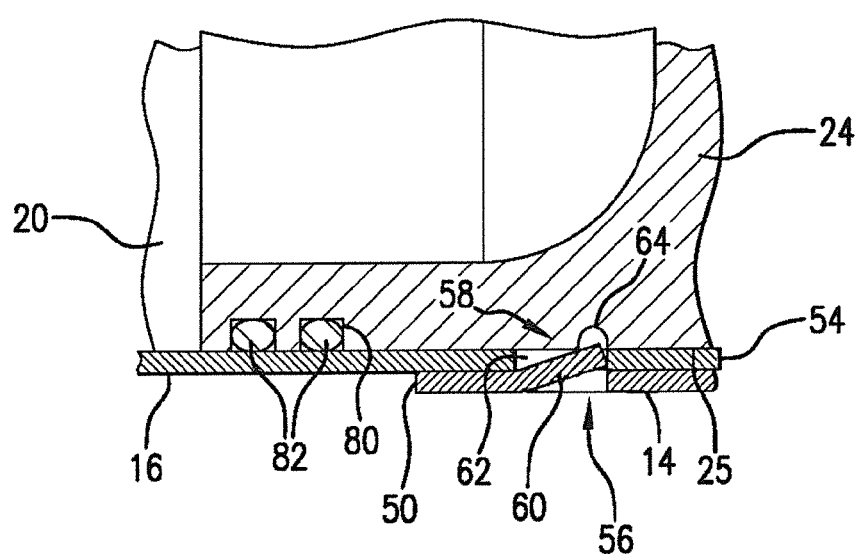
FIG. 4 is an enlarged fragmentary sectional view of a portion of FIG. 3.

Referring to FIGS. 3 and 4, the first housing portion 14 includes an end 50 disposed over a first connection end 52 of the bulkhead 24. Similarly, the second housing portion 16 includes an open end 54 disposed over a second end 55 of the bulkhead 24 that is opposite the first connection end 52. Each of the first and second housing portions 14 and 16 include an attachment portion adjacent to the open end, and around the corresponding connection end 52 or 55.

In one embodiment of this invention, the open end of one of the first and second housing portions fits over the open end of the other of the first and second housing portions. As shown in FIG. 3, a length of the second housing portion 16 is disposed through and within the open end 50 of the first housing portion 14, thereby placing an attachment portion 58 of the second housing portion 16 between an attachment portion 56 of the first housing portion 14 and the side wall 25 of the bulkhead 24.

As best shown in FIG. 4, the attachment portion 56 includes a protrusion, embodied as tab 60, that inwardly extends at an angle from the first housing portion 14 into a corresponding receiver 62 of the attachment portion 58 of the second housing portion 16 that has a size and shape adapted to receive the tab 60. During assembly, the two housing portions 14 and 16 are placed over the corresponding connection end, 52 or 55, of the bulkhead 24. The open end 54 of the second housing portion 16 fits into the open end 50 of the first housing portion 14, until the tab 60 is aligned with the corresponding receiver 62. The tabs 60 then are crimped into the receiver 62 to lock the two housing portions 14 and 16 together. An optional groove 64 can be included in the bulkhead 24 to allow further space for the bent tab 60, thereby ensuring a secure fit.

Figure 2:
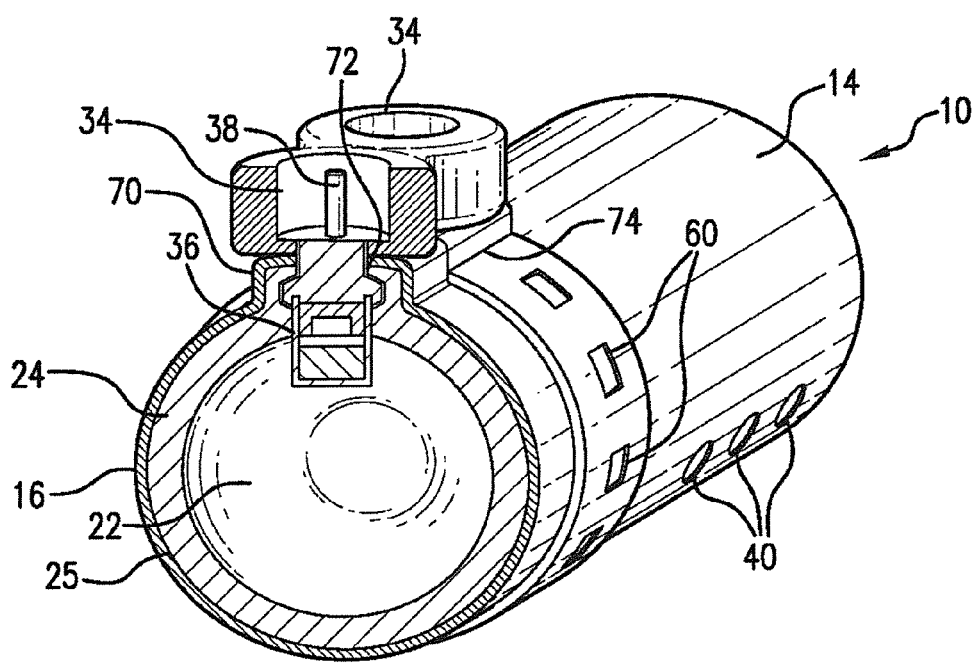
FIG. 2 is a sectional view of the inflator shown in FIG. 1.

As seen in FIGS. 1 and 2, a plurality of tabs 60 are positioned around the circumference of the tubular first housing portion 14, each crimped or bent into a locking position within a corresponding receiver on the second housing portion 16. Each of the tabs 60 and receivers 62 are cut and/or stamped from the metal housing wall. As will be appreciated various sizes, shapes, and configurations are available for the protrusions and receivers of this invention. For example, the receiver can be formed as a depression or groove cut within the housing, but not extending through the housing. The protrusion could be an outwardly or inwardly extending pin corresponding to an opening or depression in the other housing portion. Also, either housing portion can include the protrusion while the other includes the receiver. Referring to the illustrated embodiment, the inner attachment portion 58 could alternatively include an outwardly extending preformed tab corresponding to a receiver in the outer attachment portion 56.

As shown in FIGS. 2 and 3 the housing portions 14 and 16 each include a slot opening to allow the connector sockets 34 to radially extend from the housing. The slots fit around a radially extending portion of the bulkhead, and allow the two housing portions 14 and 16 to contact each other over a bulkhead having a radially extending piece, such as including the connector sockets 34. In one embodiment of this invention, as illustrated in FIG. 2, the second housing portion 16 has a raised portion 70 including a slot 72 that extends around a portion of bulkhead 24. The first housing portion 14 includes a slot 74 that receives or fits around a length of the raised portion 70 outside of the second housing portion 16. The size and configuration of the slots of the housing portions will depend on the size, shape, and configuration of the bulkhead.

The slots 72 and 74 can also add further support to the initiator during actuation. As shown in FIG. 2, the slot 70 extends around the connector pins 38, but over the initiators 26 and 36, thereby providing structural support against the pressure of an actuated initiator.

As shown in FIGS. 3 and 4, the bulkhead 24 includes circumferential grooves 80 extending around each of the connection ends 52 and 54. A sealing member 82, such as in the form of an O-ring, is disposed in each of the grooves 80. The O-ring sealing members 82 provide a hermetic seal in lieu of a weld joint.

Thus, the invention provides an inflator with a two-piece housing connection that does not require any welding. The mechanical coupling of the two housing portions provides a simple and cost-efficient forming process, while still providing a hermetic seal through the use of sealing members, and provides structural support for the initiators mounted in the bulkhead.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An inflator comprising:
an elongated tubular housing at least in part defining a chamber, the housing including a first housing portion connected to a second housing portion by a plurality of tabs each cut from a metal first housing wall of the first housing portion and having a respective one of the plurality of tabs crimped into a corresponding one of a plurality of receiver openings formed in the second housing portion to lock the first housing portion to the second housing portion;
an initiator operatively associated with the chamber; and
a bulkhead including the initiator, the bulkhead including a center wall at least partially dividing the chamber into a primary chamber partially enclosed by the first housing portion and a secondary chamber partially enclosed by the second housing portion.

2. The inflator of claim 1 further comprising a gas generant material within the chamber.

3. The inflator of claim 1 further comprising a gas generant pressurized gas stored within the chamber.

4. The inflator of claim 1 wherein each of the tabs extends at an angle from the metal first housing wall of the first housing portion.

5. The inflator of claim 4 wherein each of the receiver openings has a size and shape to receive a corresponding one of the plurality of tabs therein.

6. The inflator of claim 5 further comprising a pressurized fluid within the chamber and wherein connection of the first housing portion to the second housing portion is free of a weld.

7. The inflator of claim 1 wherein each of the tabs comprises an angularly displaced tab portion of the first housing wall portion.

8. An inflator comprising:
an elongated tubular housing at least in part defining a chamber, the housing including a first housing portion connected to a second housing portion by a plurality of structural crimp tabs each cut from a metal first housing wall of the first housing portion and crimped into locking position into a corresponding one of a plurality of receiver openings formed in the second housing portion to mechanically couple the first housing portion to the second housing portion;
an initiator operatively associated with the chamber; and
a bulkhead including the initiator, the bulkhead including a center wall at least partially dividing the chamber into a primary chamber partially enclosed by the first housing portion and a secondary chamber partially enclosed by the second housing portion.

9. The inflator of claim 8 further comprising a gas generant material within the chamber.

10. The inflator of claim 8 further comprising a pressurized gas stored within the chamber.

11. The inflator of claim 8 wherein each of the structural crimp tabs extends at an angle from the metal first housing wall of the first housing portion.

12. The inflator of claim 11 wherein each of the receiver openings has a size and shape to receive a corresponding one of the plurality of structural crimp tabs therein.

13. The inflator of claim 12 further comprising a pressurized fluid within the chamber and wherein connection of the first housing portion to the second housing portion is free of a weld.

14. The inflator of claim 8 wherein each of the structural crimp tabs comprises an angularly displaced tab portion of the first housing wall portion.

15. An inflator comprising:
an elongated tubular housing at least in part defining a chamber containing at least a first gas generant for forming a first inflation gas, the housing including a first housing portion mechanically coupled to a second housing portion by a plurality of tab protrusions formed from a first housing wall of the first housing portion each crimped into a corresponding one of a plurality of receiver openings formed in a second housing wall of the second housing portion to lock the first housing portion to the second housing portion, wherein the tab protrusions each comprise an angularly displaced tab portion of the first housing wall portion;
an initiator operatively associated with the chamber; and
a bulkhead including the initiator, the bulkhead including a center wall at least partially dividing the chamber into a primary chamber partially enclosed by the first housing portion and a secondary chamber partially enclosed by the second housing portion.

16. The inflator of claim 15 wherein the first gas generant is contained in the primary chamber, the inflator further comprising a second gas gencrant material within the secondary chamber.

17. The inflator of claim 15 further comprising a pressurized gas stored within the chamber.

18. The inflator of claim 15 wherein each of the tab protrusions extends at an angle from the first housing wall of the first housing portion.

19. The inflator of claim 18 wherein each of the receiver openings has a size and shape to receive a corresponding one of the plurality of tab protrusions therein.

20. The inflator of claim 19 further comprising a pressurized fluid within the chamber and wherein connection of the first housing portion to the second housing portion is free of a weld.

* * * * *